United States Patent
Aurongzeb et al.

(10) Patent No.: US 12,066,908 B2
(45) Date of Patent: Aug. 20, 2024

(54) SYSTEM AND METHOD FOR PREDICTING AND AVOIDING HARDWARE FAILURES USING CLASSIFICATION SUPERVISED MACHINE LEARNING

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 69 days.

(21) Appl. No.: 17/877,076

(22) Filed: Jul. 29, 2022

(65) Prior Publication Data

US 2024/0036999 A1    Feb. 1, 2024

(51) Int. Cl.
*G06F 11/20* (2006.01)
*G06F 9/50* (2006.01)

(52) U.S. Cl.
CPC ........ *G06F 11/2033* (2013.01); *G06F 9/5044* (2013.01); *G06F 9/5055* (2013.01)

(58) Field of Classification Search
CPC ............. G06F 11/0709; G06F 11/0793; G06F 11/0748
See application file for complete search history.

(56) References Cited

U.S. PATENT DOCUMENTS

| | | | | |
|---|---|---|---|---|
| 5,483,637 A | * | 1/1996 | Winokur | H04L 43/00 714/26 |
| 7,051,230 B2 | * | 5/2006 | Olson | G06F 11/0748 717/124 |

(Continued)

FOREIGN PATENT DOCUMENTS

WO    2011/106160 A2    9/2011

OTHER PUBLICATIONS

C. Herrmann, et al., "Sustainability as Strategic Business Model for Profitable Business," 6 pages, May 2014.

(Continued)

*Primary Examiner* — Amine Riad
(74) *Attorney, Agent, or Firm* — Prol Intellectual Property Law, PLLC; H. Kenneth Prol

(57) ABSTRACT

A hardware failure prediction and avoidance system executing on a unified endpoint management platform information handling system comprising a network interface device (NID) to receive failed operational telemetries for client devices including power and software analytics, and event viewer error logs, and an error associated with a hardware type, a processor to execute a classification supervised learning algorithm on the failed operational telemetries to determine that a hardware or software configuration will likely co-occur with a future error of the hardware type, identify the hardware or software configuration as problematic, the processor to identify the problematic system configuration in a current operational telemetry by correlating the current operational telemetry with a portion of the failed (Continued)

operational telemetries, and the NID to transmit a recommendation to the first client device to adjust the problematic system configuration in order to avoid occurrence of the error at the first client device.

20 Claims, 4 Drawing Sheets

(56) References Cited

U.S. PATENT DOCUMENTS

| | | | |
|---|---|---|---|
| 7,694,291 B2 | 4/2010 | Chen | |
| 7,698,543 B2* | 4/2010 | Sarwono | H04L 41/0869 709/224 |
| 7,849,354 B2* | 12/2010 | Prabhakaran | G06F 11/1402 717/170 |
| 8,626,450 B2 | 1/2014 | Dooley | |
| 8,904,374 B2 | 12/2014 | Nakamura | |
| 9,710,122 B1* | 7/2017 | Pillay | H04L 41/12 |
| 9,876,673 B2* | 1/2018 | Margalit | H04L 41/0631 |
| 10,146,286 B2 | 12/2018 | Lee | |
| 10,157,100 B2* | 12/2018 | Shivanna | G06Q 10/20 |
| 10,254,808 B2 | 4/2019 | Messick | |
| 10,289,184 B2 | 5/2019 | Malik | |
| 10,429,921 B2 | 10/2019 | Potlapally | |
| 10,599,998 B2* | 3/2020 | Horie | G06N 20/00 |
| 10,705,786 B2 | 7/2020 | Liu | |
| 10,803,405 B1 | 10/2020 | Levchuk | |
| 10,938,954 B2 | 3/2021 | Lee | |
| 10,977,293 B2 | 4/2021 | Cai | |
| 11,009,938 B1 | 5/2021 | Law | |
| 11,138,168 B2* | 10/2021 | Purushothaman | H04L 43/0823 |
| 11,163,637 B1* | 11/2021 | Bikumala | G06F 11/0793 |
| 11,275,421 B2* | 3/2022 | Tsuda | G06N 3/08 |
| 11,347,575 B2* | 5/2022 | Wu | G06F 11/0787 |
| 11,521,086 B2* | 12/2022 | Bhimireddy | G06F 11/004 |
| 11,556,409 B2* | 1/2023 | Kantharaj | G06N 20/00 |
| 11,558,272 B2* | 1/2023 | Ranjan | G06F 11/0751 |
| 11,593,211 B2* | 2/2023 | Bhattacharyya | G06F 11/1471 |
| 2003/0097617 A1* | 5/2003 | Goeller | G06F 11/0793 714/39 |
| 2004/0181708 A1* | 9/2004 | Rothman | G06F 11/0793 714/10 |
| 2005/0066236 A1* | 3/2005 | Goeller | G06F 11/0793 714/39 |
| 2008/0098379 A1* | 4/2008 | Newman | G06F 9/44505 717/168 |
| 2008/0126881 A1* | 5/2008 | Bruckhaus | G06F 11/008 714/E11.144 |
| 2009/0132461 A1* | 5/2009 | Garg | H04L 9/3247 706/54 |
| 2009/0292617 A1 | 11/2009 | Sperling | |
| 2010/0070404 A1 | 3/2010 | McConnell | |
| 2010/0157981 A1* | 6/2010 | Dawson | H04L 67/61 370/352 |
| 2010/0262960 A1* | 10/2010 | Oshiumi | G06F 11/1433 714/48 |
| 2012/0239981 A1* | 9/2012 | Franke | G06F 11/368 714/E11.217 |
| 2013/0103990 A1* | 4/2013 | Hopper | G06F 11/0793 714/49 |
| 2014/0100937 A1 | 4/2014 | Na | |
| 2014/0143625 A1* | 5/2014 | Watanabe | G06F 11/008 714/741 |
| 2014/0316964 A1 | 10/2014 | Slutsker | |
| 2015/0227741 A1* | 8/2015 | Permeh | G06F 21/51 726/22 |
| 2018/0329800 A1* | 11/2018 | Mcintyre | G06F 11/0748 |
| 2019/0004891 A1* | 1/2019 | Bi | G06F 11/0793 |
| 2019/0349321 A1 | 11/2019 | Cai | |
| 2019/0362262 A1* | 11/2019 | Inagi | G06F 30/20 |
| 2020/0133911 A1* | 4/2020 | Rao | H04L 41/0806 |
| 2020/0326698 A1* | 10/2020 | Kikuchi | G05B 13/027 |
| 2021/0373638 A1 | 12/2021 | Schluessler | |
| 2022/0229720 A1* | 7/2022 | Kantharaj | G06F 11/3476 |
| 2022/0253727 A1* | 8/2022 | Watson | G06N 20/00 |
| 2022/0283890 A1* | 9/2022 | Chopra | G06F 11/1433 |
| 2022/0357733 A1* | 11/2022 | Crane | G05B 23/0281 |
| 2023/0177406 A1* | 6/2023 | Hammer | G06N 5/045 706/12 |
| 2023/0251953 A1* | 8/2023 | Joshi | G06F 11/302 714/38.1 |
| 2023/0315553 A1* | 10/2023 | Kumar | G06F 11/0787 714/47.3 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

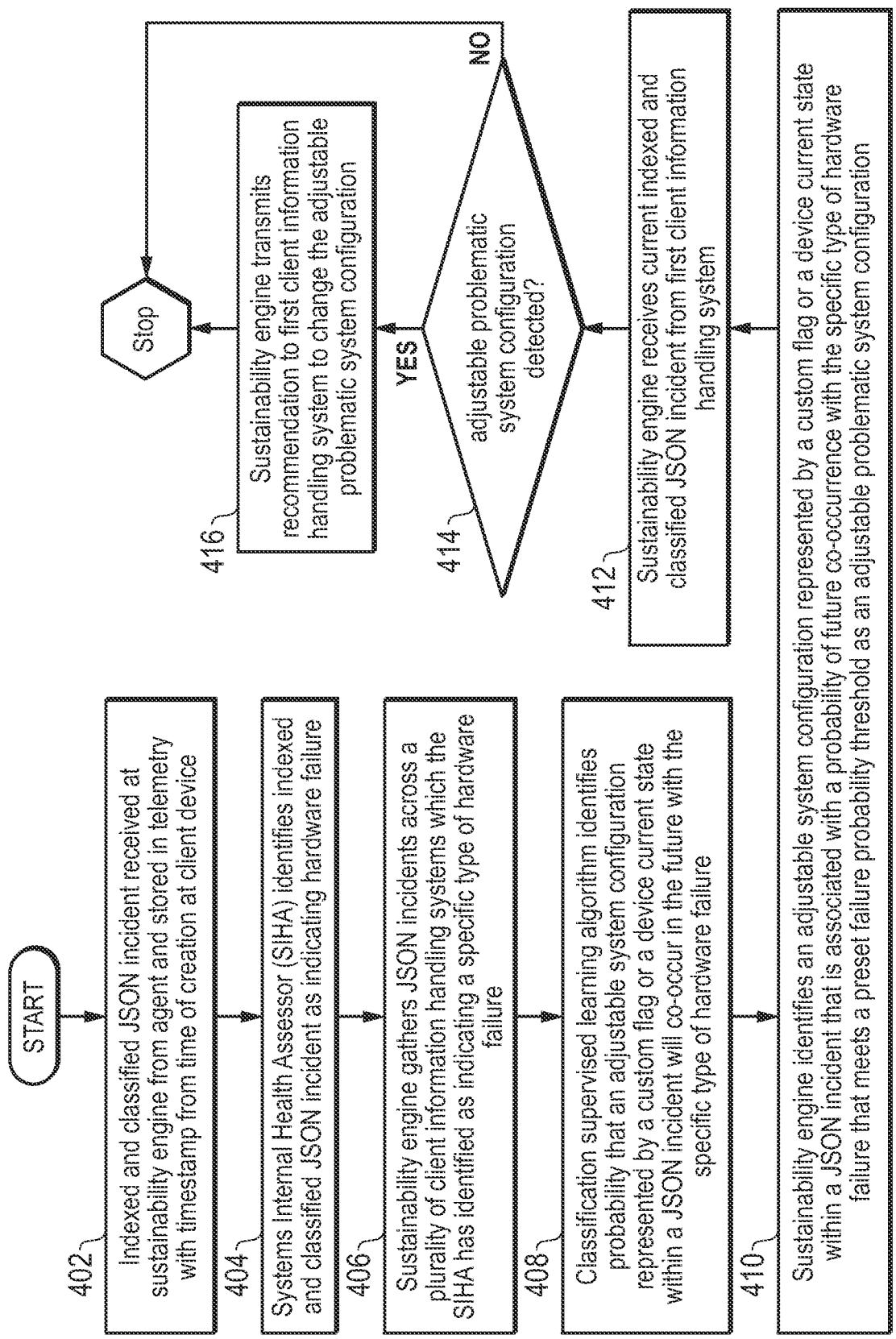

SYSTEM AND METHOD FOR PREDICTING AND AVOIDING HARDWARE FAILURES USING CLASSIFICATION SUPERVISED MACHINE LEARNING

FIELD OF THE DISCLOSURE

The present disclosure generally relates to correlating hardware failures with various adjustable system configurations for a plurality of client information handling systems. More specifically, the present disclosure relates to a method of predicting future occurrence of hardware failures based on presence of problematic adjustable system configurations and adjusting those problematic adjustable system configurations prior to such hardware failure to avoid such future failures.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a flow diagram illustrating a method of predicting and avoiding future hardware failures according to an embodiment of the present disclosure.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

One of the most costly and frustrating problems for users of information handling systems is hardware failures. In many cases, such failures result in inability to use the information handling system for the purposes the user intends, and can even result in costly replacement of hardware components. In some cases, these hardware failures may be caused by a confluence of system configurations or usage patterns at the information handling system that may have been avoidable. A system is needed to predict when certain patterns of usage or configuration for software, firmware, or hardware at an information handling system may be likely to result in a potentially avoidable hardware failure.

The hardware failure prediction and avoidance system in embodiments of the present disclosure addresses these issues by performing a classification supervised learning algorithm across a pool of information describing such software, firmware, or hardware usage and configurations across a plurality of client information handling systems that have experienced hardware failures in the past to identify combinations of usage and configurations that may be likely to produce such failures in the future. In various embodiments, the hardware failure prediction and avoidance system may routinely monitor current telemetries recording software, firmware, and hardware usage and configurations across a plurality of client information handling systems in real time to detect occurrence of the combinations of usage and configurations identified by the classification supervised learning algorithm to likely cause future failures. When such an occurrence of problematic combinations of usage and configurations are detected in current telemetry, the hardware failure prediction and avoidance system may recommend adjustments to such hardware, software, or firmware usage or configuration to avoid the potential hardware failure previously caused by such a combination, prior to its occurrence.

Figure 1:
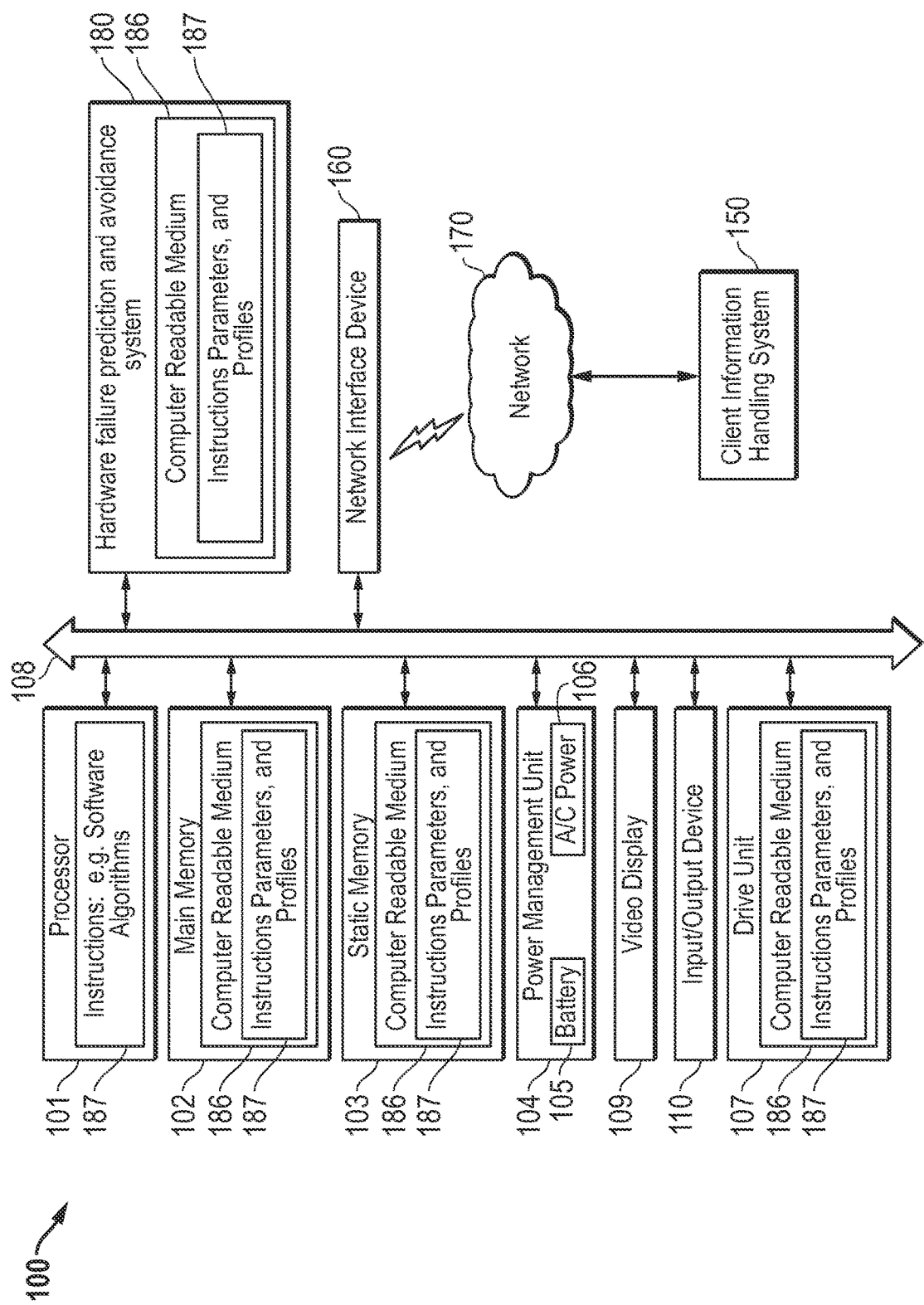
FIG. 1 is a block diagram illustrating an information handling system according to an embodiment of the present disclosure.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 186 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing code instructions of the hardware failure prediction and avoidance system 180, the wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 187, such as for the hardware failure prediction and avoidance system 180 that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 186 storing instructions 187. In some embodiments, information handling system 100, or portions thereof, may represent a client information handling system operating various hardware components (e.g., processor 101, memory 102, network interface device 160, power management unit 104) in need of occasional replacement, and executing an agent of the hardware failure prediction and avoidance system 180, as described in greater detail below with respect to FIG. 2. In other embodiments the information handling system 100 may represent a server information handling system a hardware failure prediction and avoidance system 180, operating system (OS) software, application software, BIOS software, or other software applications or drivers detectable by processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6*e*. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, so that a device connected to a network 170 may communicate voice, video or data over the network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as predicting a likelihood that certain adjustable software configurations may co-occur with hardware failures and recommend adjustment to these adjustable software configurations in order to avoid such future hardware failures. For example, instructions 187 may include a particular example of a hardware failure prediction and avoidance system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The hardware failure prediction and avoidance system 180 may utilize a computer-readable medium 186 in which one or more sets of instructions 187 may operate in part as software or firmware instructions executed on the information handling system 100. The instructions 187 may embody one or more of the methods or logic as described herein. For example, instructions relating to the hardware failure prediction and avoidance system 180, firmware or software algorithms, processes, and/or methods may be stored here. Such instructions 187 may comprise predicting a likelihood that certain adjustable software configurations may co-occur with hardware failures and recommend adjustment to these adjustable software configurations in order to avoid such future hardware failures. For example, a sequence of error conditions or failures are reported, in failed operational telemetries, and determined to be tracked within one or more potential adjustable software configurations, the sequence of which may lead to a hardware failure such that executing code instructions 187 of the hardware failure prediction and avoidance system 180 may correlate and predict hardware failures via the a classification supervised learning algorithm based on such a sequence occurring at a client information handling system in embodiments herein. The hardware failure prediction and avoidance system 180 may operate within a Unified Endpoint Management (UEM) platform that gathers telemetries from a plurality of client information handling system 150 endpoints via the network 170 that describe operating environments for those client information handling systems (e.g., 150). The UEM platform in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a sever executing a UEM platform. In other embodiments, the information handling system 100 may depict a client information handling system (e.g., 150) that reports to a UEM and receives recommendations from the UEM pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the hardware failure prediction and avoidance system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
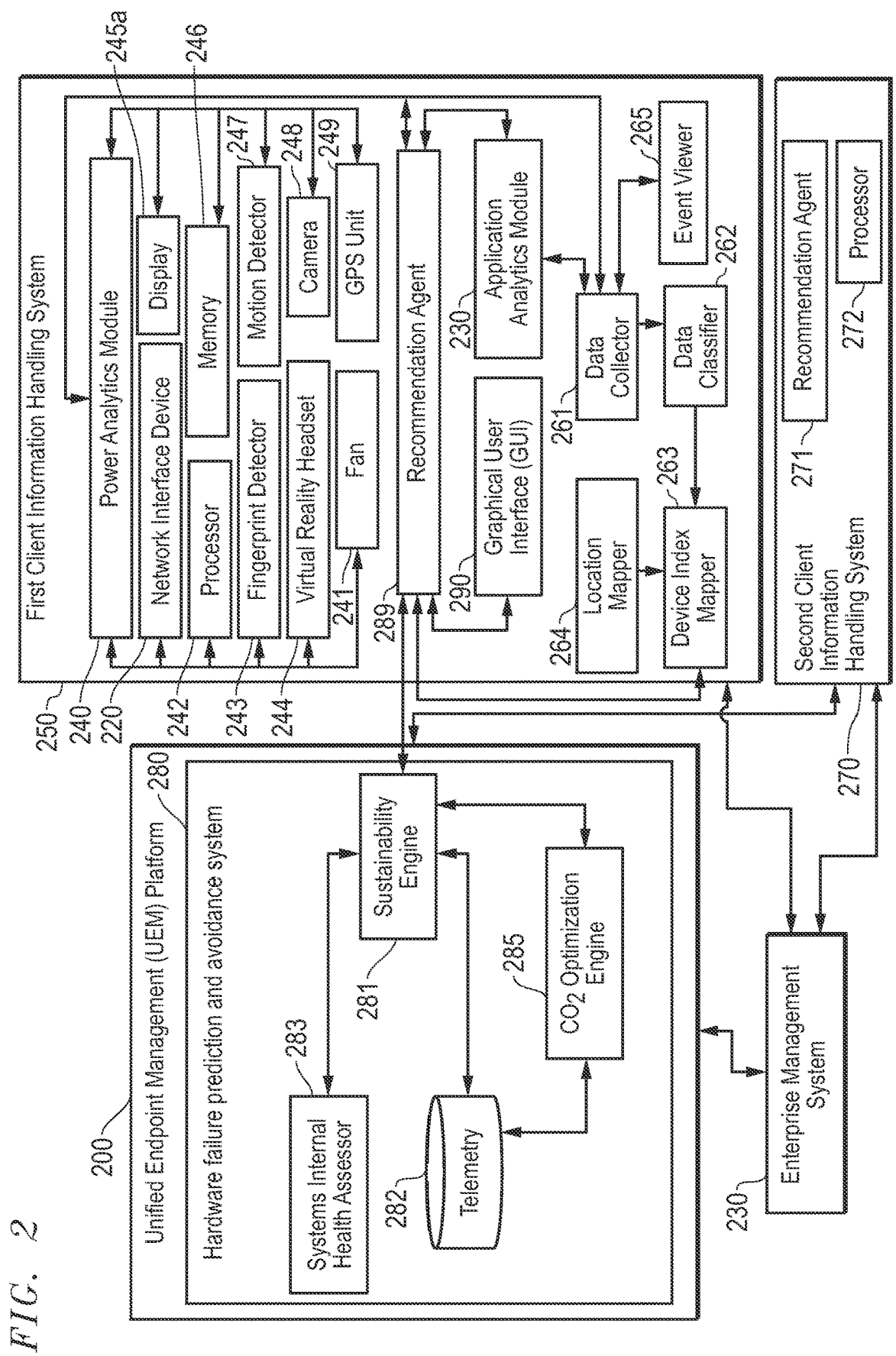
FIG. 2 is a block diagram illustrating hardware failure prediction and avoidance system of unified endpoint management (UEM) platform for one or more client information handling systems according to an embodiment of the present disclosure.

FIG. 2 is a block diagram illustrating a hardware failure prediction and avoidance system communicating recommended adjustments to operating environment of a remote client information handling system according to an embodiment of the present disclosure. A unified endpoint management (UEM) platform 200 in an embodiment may execute a hardware failure prediction and avoidance system 280 to extend hardware lifetimes at a plurality of client information handling systems (e.g., 250 and 270) under management of or in communication with an enterprise management system 230, which may act as an interface between the client information handling system (e.g., 250 or 270) and the UEM platform 200. The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather telemetries from a plurality of client information handling system (e.g., 250 and 270) that describe operating environments for those client information handling systems (e.g., heat measurements, failures or errors associated with one or more hardware components, or analytics for software usage).

A hardware failure prediction and avoidance system 280 in an embodiment may perform a classification supervised learning algorithm across a pool of information describing adjustable system configurations (e.g., software, firmware, or hardware usage and configurations) across a plurality of client information handling systems (e.g., 250 and 270) that have experienced hardware failures in the past, to identify one or more adjustable system configurations that may be likely to produce such failures in the future. In various embodiments, the hardware failure prediction and avoidance system 280 may routinely monitor current telemetries recording adjustable system configurations across a plurality of client information handling systems (e.g., 250 and 270) in real time to detect occurrence of the one or more adjustable system configurations identified by the classification supervised learning algorithm to likely cause future failures.

When such an occurrence of problematic adjustable system configurations are detected in current telemetry, the hardware failure prediction and avoidance system 280 may recommend adjustments to such problematic adjustable system configurations to avoid the potential hardware failure previously caused by such a combination, prior to its occurrence.

The UEM platform 200 may receive telemetries upon which such predictions and recommendations may be made from a plurality of client information handling systems (e.g., 250 and 270), which may be managed by the same enterprise management system (e.g., 230), or may be managed by separate enterprise management systems in various embodiments. Each client information handling system (e.g., 250 or 270) in an embodiment may include a plurality of hardware components. For example, a first client information handling system 250 in an embodiment may include a network interface device 220, a processor (e.g., central processing unit (CPU), graphics processing unit (GPU), or visual processing unit (VPU)) 242, a display 245, a memory 246, and one or more components of a power supply unit (e.g., battery). In some embodiments, the first client information handling system 250 may further include one or more sensing devices, such as a fingerprint detector 243, a motion detector 247, location sensing devices 249 (e.g., GPS location unit), a temperature monitor or thermal measurement device 241, or camera 248, which may also be used during execution of videoconferencing software applications, for example. In another embodiment, the first client information handling system 250 may further be operably connected to one or more peripheral devices, such as a virtual reality headset 244, for example. Such an operably connection may employ a driver or firmware for such a peripheral device in such an embodiment. One or more of the other hardware components described herein (e.g., 220, 241, 242, 243, 244, 245, 246, 247, 248, or 249) may further operate according to firmware or driver instructions in an embodiment.

A power analytics module 240 in an embodiment may be in communication with various hardware components (e.g., 220, 241, 242, 243, 244, 245, 246, 247, 248, or 249) and firmware for those components in an embodiment. For example, the power analytics module 240 may monitor power consumption by each of the various hardware components (e.g., 220, 241, 242, 243, 244, 245, 246, 247, 248, or 249) in an embodiment, as well as thermal measurements made by the temperature monitor 241 at various locations throughout the first client information handling system 250. In another example embodiment, the power analytics module 240 may also access firmware for hardware components (e.g., 220, 241, 242, 243, 244, 245, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage as a percentage of total capacity for the processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the display 245 to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 248 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 241, 242, 243, 244, 245, 246, 247, 248, or 249). In some embodiments, the power analytics module 240 may receive updated drivers, direct installation of those drivers, or pause repeated attempts at unsuccessful driver installations in order to increase efficiency of associated hardware components (e.g., 220, 241, 242, 243, 244, 245, 246, 247, 248, or 249). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the processor 242 or memory 246 that may be used by idle or background applications.

As described herein, the data collector module 261 in an embodiment may gather data regarding hardware configuration and power consumption from the power analytics module 240 and data regarding software performance and processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 241, 242, 243, 244, 245, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning, such as a temperature measurement from temperature monitor 241 exceeding a preset maximum temperature threshold value.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) based to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., processor error), or a single notification or warning from an analytics module (e.g., temperature monitor 241 recorded a temperature exceeding a preset maximum temperature threshold value). In other cases, a JSON event may include routinely gathered information such as current configurations or policies for various hardware components (e.g., 220, 241, 242, 243, 244, 245, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1655156447 |
| Client Device ID | 123456 |
| Event ID | 456789 |
| Errors, notifications, warnings | Workload on processor: 90% |
| | WHEA error at processor |
| | Processor end of life reached |
| | Memory operating at 100 W |
| | Fan operating at 100 W |
| | Temperature above 150 degrees Fahrenheit |
| | Display Driver 14.3 Install Unsuccessful |
| | Gaming Application initialization unsuccessful |
| Location | Austin, TX |
| Model | Laptop 7400 |
| Hardware Configuration | WLAN network interface device; |
| | WWAN network interface device; |
| | Bluetooth ® network interface device; |
| | 16 GB memory; |
| | X series CPU; |
| | G Series GPU; |
| | 256 GB Solid State Drive (SSD); |
| | 15.6 inch full high definition (HD) organic light emitting diode (OLED) display; |
| | Display driver version 14.2 |
| | Virtual Reality headset peripheral; |
| | Motion detector; |
| | Camera; |
| | Fingerprint detector; |
| Hardware Performance | WWAN Interface Device transceived 100 GB |
| | Display in High Definition Mode |
| | Motion Detector Set to Continuous Monitor |
| | Camera in High Resolution Mode |
| Software Performance | Operating System 10.2; |
| | Display Driver Install Time 97 minutes |
| | Video Conference Software Application using 90% antenna; |

TABLE 1-continued

Code Compiling Software Application using 90% CPU;
Gaming Software Application using 90% GPU;

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "fan_power_consumption" : 100W
        "Temp" : 150_F,
        "Unsuccessful_driver_install_attempts" : display_driver_14.3,
        "Unsuccessful_initialization_attempt" : gaming_app,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
  }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Some JSON events in an embodiment may indicate a hardware failure, such as the JSON event named "WHEA_error," having a value of CPU, indicating a failure at the CPU. In embodiments where a JSON event indicating a hardware error identifying by the systems internal health assessor (as described below and with respect to FIG. 4 at block 404) appear, the JSON incident may comprise a failed operational telemetry for an information handling system. Some JSON events in an embodiment may represent adjustable system configuration that may correlate with hardware failures in an embodiment. For example, the JSON event named "display_mode" having a value of high_definition may represent an adjustable system configuration placing the display into a high definition mode. Upon reformatting of information in an embodiment, the data collector 261 may transmit the JSON incident comprising failed operational telemetry to the data classifier 262. In an embodiment, the data classifier 262 may operate to analyze the contents of the JSON incident comprising failed operational telemetry, to classify the type of JSON events included therewithin, and to edit the JSON incident to generate a second JSON incident that includes that classification type.

Classification types may be preset according to instructions received by the hardware failure prediction and avoidance system 280 by the recommendation agent 289. Such classification types may assist the sustainability engine 281 and systems internal health assessor 283 in determining a probability that a given adjustable system configuration described by a JSON event within a JSON incident comprising failed operational telemetry will co-occur in future JSON incidents with a given hardware failure indicator, as described in greater detail below. In example embodiments, classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the hardware failure prediction and avoidance system 280 with JSON events titled "CPU_workload_code_compiling_software_app" having a value exceeding 85%. In another example, an incident classification for "Config," identifying a hardware configuration or policy that may result in various hardware component failures in an embodiment may be associated with JSON events titled "Config," having a value such as "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident comprising failed operational telemetry described above to identify whether any of the JSON events and values associated with preset incident classifiers appear within the JSON incident. For example, the data classifier 262 in an embodiment may determine the JSON incident comprising failed operational telemetry described above includes the JSON event named "CPU_workload," having a value of 0.90, or 90%, which is greater than the preset maximum CPU workload of 85%. The data classifier 262 in such an embodiment may further identify the JSON event named "Temp," having a value of 150_F. The data classifier 262 in an embodiment may apply such a classification by editing the JSON incident comprising failed operational telemetry received from the data collector 261 to generate a classified JSON incident comprising failed operational telemetry that includes the following incident classification, in addition to the data nodes described above, within the JSON incident:

```
{
    "incident_class" : Workload
    "incident_class" : Driver_perf,
    "incident_class" : Config,
}
```

The classified JSON incident comprising failed operational telemetry in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident comprising failed operational telemetry to generate an indexed and classified JSON incident comprising failed operational telemetry that includes this information, such as shown directly below, which is then transmitted to the recommendation agent 289, and then to the sustainability engine 281 of the UEM platform 200:

```
{
    "data" :
    {
        "event_id" : 456789,
        "source_ID" : power_analytics_module,
        "timestamp_unixtime_ms" : 1544145336,
        "custom_flags" :
```

-continued

```
        {
            "CPU_workload_code_compiling_software_app" : 0.90,
            "WHEA_Error" : CPU,
            "Device_End_of_Life" : CPU,
            "Memory_power_consumption" : 100W
            "fan_power_consumption" : 100W
            "Temp" : 150_F,
            "Unsuccessful_driver_install_attempts" : display_driver_14.3,
            "Unsuccessful_initialization_attempt" : gaming_app,
            "Device_Driver_Call_Failure_Rate" : 0.55
        }
        "device_current_state :
        {
            "NID_1_type" : WLAN,
            "NID_2_type" : WWAN,
            "NID_2_data_transceived" : 100 GB,
            "NID_3_type" : BT,
            "memory_type" : 16_GB,
            "CPU_type" : X_Series,
            "GPU_type" : G_Series,
            "SSD_type" : 256_GB,
            "Display_type" : 15.6_HD_OLED,
            "Display_driver_version" : 14.2,
            "Display_mode" : high_definition,
            "Camera_type" : webcam,
            "Camera_detection_mode" : continuous_monitor,
            "Camera_capture_mode" : high_resolution,
            "OS_Version" : 10.2
            "Video_Conference_App" : Active
            "Gaming_App" : Active
            "Code_Compiling_App" : Background
        }
    }
}
    "incident_class" : Workload
    "incident_class" : Driver_perf,
    "incident_class" : Config,
}
```

The hardware failure prediction and avoidance system 280 operating at the UEM platform 200 in an embodiment may include a sustainability engine 281, telemetry storage 282, a systems internal health assessor 283, and a CO2 optimization engine 285. The sustainability engine 281 in an embodiment may operate to routinely gather indexed and classified JSON incidents from recommendation agents (e.g., 289 and 271) operating at a plurality of information handling systems (e.g., 250, and 270, respectively). Each indexed and classified JSON incident comprising failed operational telemetry thus received in an embodiment may be stored in telemetry 282 for later analysis by the Systems Internal Health Assessor (SIHA) 283 or the hardware failure prediction and avoidance system 280. Such telemetry may also include information such as an equivalent CO2 emissions value determined at one or more client information handling systems (e.g., 250) resulting from usage of software applications, or known statistics for GHG emissions due to power consumption in the measured location of a client information handling system (e.g., 250).

The systems internal health assessor (SIHA) 283 in an embodiment may identify the indexed and classified JSON incident comprising failed operational telemetry described above as indicating failure of a hardware component of a given hardware type, or substantial functional inefficiency of the same. For example, the SIHA 283 in an embodiment may search the indexed and classified JSON incident comprising failed operational telemetry described above, which has been transmitted to the sustainability engine 281 and stored in telemetry 282 to identify the JSON event named "WHEA_Error," having a value CPU, indicating an error, such as a substantial inefficiency in the function at the CPU.

Upon identification of such an error associated with an identified hardware component, the SIHA 283 may transmit a notification to the sustainability engine 281 that the indexed and classified JSON incident comprising failed operational telemetry (e.g., identified by event id given within the indexed and classified JSON incident) indicates poor health of a hardware component. In other embodiments, the SIHA 283 may identify JSON events named "WHEA_Error," having values identifying any of the hardware components (e.g., 220, 241, 242, 243, 244, 245a, 245b, 246, 247, 248, or 249) included within the first client information handling system 250. The SIHA 283 in such embodiments may accordingly notify the sustainability engine 281 of the indexed and classified JSON incident comprising failed operational telemetry including such errors and indicating poor health of the identified hardware component.

In another aspect, the telemetry 282 may also include results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs, or sequences of the same, translated into JSON incidents of hardware failures, errors, or underperformance at reporting client information handling systems (e.g., 250 or 270). In other embodiments, the SIHA 283 may determine that a component is failing if one or more JSON incidents comprising failed operational telemetry for the information handling system (e.g., 250) using that hardware component (e.g., 242) include a number of errors for that component (e.g., 242) that meets or exceeds a maximum error threshold (e.g., 100, 50, 10, 5) within a preset period of time (e.g., 24 hours). These are only example maximum error threshold values and preset time period values, and any values for these thresholds are contemplated herein.

As another example, the SIHA 283 may determine that a component is failing if one or more JSON incidents, or sequences of JSON incidents comprising failed operational telemetry, for the information handling system (e.g., 250) indicate a test benchmark score for that component (e.g., 242) that falls below a preset minimum benchmark threshold value (e.g., 85% of average crowd-sourced benchmark value). As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a processor is failing may be 90%, for example.

The sustainability engine 281 in an embodiment may gather JSON incidents comprising failed operational telemetry across a plurality of client information handling systems (e.g., 250 or 270) which the SIHA 283 has identified as indicating a specific type of hardware failure. As described herein, the hardware failure prediction and avoidance system 280 in an embodiment may identify patterns in hardware failure, such as sequences of errors, underperformance of hardware or software, resource consumption levels, or other failure indicating telemetries, within such failed operational telemetry that may be used to avoid such failures in the future. In order to do so, the sustainability engine 281 in an embodiment may analyze power and software application analytics, and event viewer logs within such failed operational telemetry to identify one or more system configurations routinely co-occurring with, and potentially causing such failures. For example, patterns of sequences of errors, underperformance of hardware or software, resource consumption levels, or other failure indicating telemetries may be classified by a classification supervised learning algorithm according to embodiments herein as one or more system configurations routinely co-occurring with, and potentially causing such failures within such failed operational telemetry. These power and software application analytics and event viewer logs within such failed operational telemetry for client information handling systems experiencing hardware failures (e.g., as identified by the SIHA 283) may be stored in telemetry in the form of JSON incidents.

The CO2 optimization engine 285 in an embodiment may perform a classification supervised learning algorithm upon the failed operational telemetries identified by the SIHA 283 as indicating hardware failures to identify a probability that an adjustable system configuration represented by a custom flag or a device current state within a JSON incident will co-occur in the future with the specific type of hardware failure identified by the SIHA 283. Classification is the process of recognizing, understanding, and grouping JSON events within JSON incidents comprising failed operational telemetries into sub-populations. The CO2 optimization engine 285 in an embodiment may train a machine-learning classifier executing a classification supervised learning algorithm based on the JSON incidents comprising failed operational telemetries known to describe hardware failures in order to identify other JSON events (e.g., describing hardware, software, or firmware, usage or configurations, otherwise referred to herein as adjustable system configurations) that may routinely co-occur with JSON events identifying the known hardware failures. For example, the CO2 optimization engine 285 in an embodiment may train a machine-learning classifier to determine a probability that any given JSON event within the JSON incidents comprising failed operational telemetries identified by the SIHA 283, or any given JSON events or group of JSON events within the JSON incidents or sequence of JSON incidents identified by the SIHA 283, as indicating hardware failure will co-occur in the future with the same type of hardware failure.

The CO2 optimization engine 285 in an embodiment may perform this assignment of probabilities throughout many iterations performed across several JSON incidents identified by the SIHA 283 as identifying a hardware failure during a training process. Many types of classification algorithms may be used in various embodiments, including logistic regression, naïve Bayes, K-nearest neighbors, decision trees, support vector machines, or gradient descent method. These classification algorithms may be trained to become classification supervised learning algorithms by adjusting probabilities assigned in each previous iteration based on the error in prediction produced in each later iteration, until the algorithm is capable of producing probabilities with an error rate below a preset error rate threshold (e.g., 1%, 2%, 5%, etc.) predicting co-occurrence of a given JSON event with a future hardware failure similar to that given in the JSON incidents comprising failed operational telemetries upon which the classifier was trained. In such a way, the CO2 optimization engine 285 in an embodiment may predict the likelihood that a similar hardware failure will occur in the future, where the same combination of adjustable system configurations are employed.

The sustainability engine 281 in an embodiment may identify an adjustable system configuration represented by a custom flag or a device current state within a JSON incident comprising failed operational telemetries that, alone or as part of a sequence of JSON events, is associated with a probability of future co-occurrence with the specific type of hardware failure that meets a preset failure probability threshold as an adjustable problematic system configuration. As described directly above, the CO2 optimization engine 285 executing a classification supervised learning algorithm in an embodiment may produce a probability that any given JSON event identifying an adjustable system configuration or combination of such JSON events will co-occur in the future with another JSON event in a sequence indicating hardware failure. The CO2 optimization engine 285 in an embodiment may transmit to the sustainability engine 281 an identification of certain JSON events associated with probabilities for co-occurrence with a future hardware failure that meet a failure probability threshold value. For example, the CO2 optimization engine 285 may transmit to the sustainability engine an identification of a JSON event or a combination of JSON events associated with a probability for co-occurrence with a future hardware failure that meets or exceeds a preset failure probability threshold value (e.g., 90%, 95%, 98%, 99%). Any JSON event identified in such a way by the CO2 optimization engine 285 in an embodiment may be labeled as a problematic adjustable system configuration.

Following such an identification of problematic adjustable system configurations in an embodiment, the sustainability engine 281 may routinely monitor future performance of the client information handling systems (e.g., 250 or 270) to identify such problematic adjustable system configurations before a similar hardware failure occurs, in order to prevent such an occurrence. For example, the sustainability engine 281 in an embodiment may receive a current indexed and classified JSON incident from a client information handling system (e.g., 270). As described herein, the hardware failure prediction and avoidance system 280 in an embodiment may routinely monitor current telemetries recording software, firmware, and hardware usage and configurations (e.g., adjustable system configurations) across a plurality of client information handling systems (e.g., 250 and 270) in real time to detect occurrence of problematic adjustable system configurations identified by the classification supervised learning algorithm to likely cause future failures. For example, the sustainability engine 281 in an embodiment may receive the following JSON incident from the second client information handling system 270:

```
{
  "data" :
  {
    "client_device_ID" : 456789,
    "client_device_model" : Laptop_5400,
    "event_id" : 567890,
    "source_ID" : power_analytics_module,
    "timestamp_unixtime_ms" : 1545256447,
    "location" : Dallas_Texas,
    "custom_flags" :
    {
      "CPU_workload_code_compiling_software_app" : 0.90,
      "Device_End_of_Life" : CPU,
      "Memory_power_consumption" : 100W
      "fan_power_consumption" : 100W
      "Temp" : 150_F,
      "Unsuccessful_driver_install_attempts" : display_driver_14.3,
      "Unsuccessful_initialization_attempt" : gaming_app,
      "Device_Driver_Call_Failure_Rate" : 0.55
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 32_GB,
      "CPU_type" : Y_Series,
      "GPU_type" : GX_Series,
      "SSD_type" : 256_GB,
      "Display_type" : 15.6_HD_LCD,
      "Display_driver_version" : 14.2,
      "Display_mode" : high_definition,
      "Camera_type" : webcam,
      "Camera_detection_mode" : continuous_monitor,
      "Camera_capture_mode" : high_resolution,
      "OS_Version" : 10.2
      "Gaming_App" : Active
      "Code_Compiling_App" : Background
    }
  }
  }
  "incident_class" : Workload
  "incident_class" : Driver_perf,
  "incident_class" : Config,
}
```

The sustainability engine 281 may determine whether the current indexed and classified JSON incident contains an adjustable problematic system configuration. As described herein, when an occurrence of one or more problematic adjustable system configurations (e.g., combinations of usage and configurations) are detected in current telemetry, the hardware failure prediction and avoidance system may recommend adjustments to such adjustable system configurations (e.g., hardware, software, or firmware usage or configuration) to avoid the potential hardware failure previously caused by such a combination, prior to its occurrence. Various hardware policy settings in an embodiment may be determined to be an adjustable problematic system configuration in an embodiment, due to high demands on various hardware components. Execution of background software applications in an embodiment may also be determined to be an adjustable problematic system configuration in an embodiment. These background software application executions may be identified with reference to the JSON incident described above, and stored in telemetry. Methods for software and firmware updates in an embodiment may also be determined to be an adjustable problematic system configuration in an embodiment. Execution of specific software applications or specific versions of software applications or firmware drivers in an embodiment may also be determined to be an adjustable problematic system configuration in an embodiment. Consumption of power for a specific hardware component in an embodiment may also be determined to be an adjustable problematic system configuration in an embodiment.

The sustainability engine 281 in an embodiment may transmit a recommendation to the second client information handling system 270 in an embodiment to change the adjustable problematic system configuration when one is identified within current telemetry. For example, in an embodiment in which the sustainability engine 281 identified a hardware policy setting as a problematic adjustable system configuration, the hardware failure prediction and avoidance system may recommend adjustment to the hardware policy settings at the second client information handling system 270 to avoid potential future failure of one or more hardware components. The hardware failure prediction and avoidance system in another embodiment may transmit a recommendation to the recommendation agent 289, for display to the user, via a GUI 290, placing the display into a power savings or standard definition mode. As another example, in an embodiment in which the sustainability engine 281 identified a background application usage as a problematic adjustable system configuration, the hardware failure prediction and avoidance system may recommend adjustment to the background application usage at the second client information handling system 270 to avoid potential future failure of one or more hardware components.

In yet another example, in an embodiment in which the sustainability engine 281 identified a software or firmware update method as a problematic adjustable system configuration, the hardware failure prediction and avoidance system may recommend adjustment to the software or firmware update methods at the second client information handling system 270 to avoid potential future failure of one or more hardware components. In still another example, in an embodiment in which the sustainability engine 281 identified execution of a software application or execution of a specific version of software or firmware as a problematic adjustable system configuration, the hardware failure prediction and avoidance system may recommend installation of updated drivers or software applications, or termination of certain software applications at the second client information handling system 270 to avoid potential future failure of one or more hardware components. In an embodiment in which one or more software applications are using hardware resources at a maximum usage value (e.g., 85%), the sustainability engine 291 may transmit a recommendation to the recommendation agent 289 for display to the user via GUI 290 to decrease the usage of those hardware component resources for those specific software applications by ten percent. In such a way, the hardware failure prediction and avoidance system may recommend adjustments to such hardware, software, or firmware usage or configuration to avoid the potential hardware failure previously caused by such a combination, prior to its occurrence.

Figure 3:
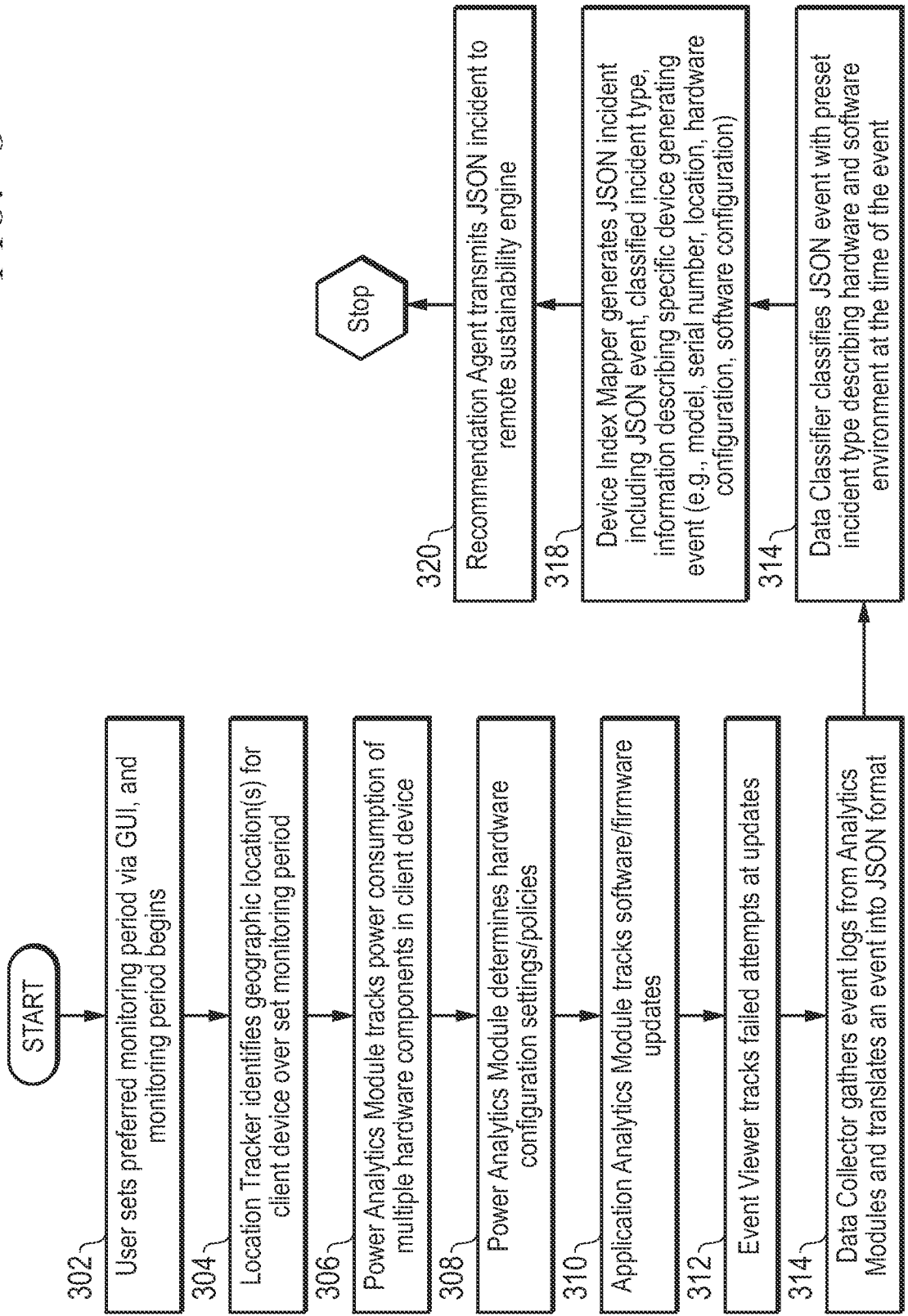
FIG. 3 is a flow diagram illustrating a method of gathering power and application analytics according to an embodiment of the present disclosure.

FIG. 3 is a flow diagram illustrating a method of gathering power and application analytics for predicting and avoiding future hardware component failures according to an embodiment of the present disclosure. As described herein, the hardware failure prediction and avoidance system in an embodiment may perform a classification supervised learning algorithm across a pool of information, such as failed operational telemetries, describing such software, firmware, or hardware usage and configurations such as adjustable system configuration across a plurality of client information handling systems that have experienced hardware failures in the past to identify combinations of usage and configurations as problematic adjustable system configurations that may be likely to produce such failures in the future. FIG. 3 describes the method of gathering information necessary to make such predictions.

At block 302, a user of the client information handling system in an embodiment may set a preferred monitoring period for monitoring hardware health at the information handling system. For example, in an embodiment described with reference to FIG. 2, the data collector 261 in an embodiment may gather data regarding hardware configuration and power consumption from the power analytics module 240 and data regarding software performance and processor usage from the application analytics module 230 at preset intervals. For example, such a preset interval may be set to a default monitoring period value (e.g., one hour, one day, one week), or may be set by the user of the first client information handling system 200 via the graphical user interface (GUI) 290.

A location tracking in an embodiment may identify a geographic location for the client information handling system over the user-specified monitoring period at block 304. For example, the location sensing unit 249 in an embodiment may determine a geographic location (e.g., zip code, GPS coordinates, city, state, country) in which the first client information handling system 250 is operating.

At block 306, the power analytics module may track power consumption of multiple hardware components in the client information handling system in an embodiment. For example, the power analytics module 240 in an embodiment may monitor power consumption by each of the various hardware components (e.g., 220, 241, 242, 243, 244, 245, 246, 247, 248, or 249) in an embodiment. In some embodiments, such hardware power consumption may be attributed to specific software applications. For example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the data collector 261.

The power analytics module in an embodiment may determine hardware configurations, settings, or policies at block 308. For example, the power analytics module 240 may access firmware for hardware components (e.g., 220, 241, 242, 243, 244, 245, 246, 247, 248, or 249) to determine policies or settings for those components at the time of power measurements made at block 306. More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In yet another example, the power analytics module 240 in an embodiment may determine a current usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

At block 310, the application analytics module may track software or firmware updates in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. All information accessed in such a way by the application analytics module 230 in an embodiment may be communicated to the data collector 261.

The event viewer may track failed attempts at firmware or software updates in an embodiment at block 312. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 241, 242, 243, 244, 245, 246, 247, 248, or 249) producing the error or consuming the unusually high power levels. As described in greater detail in FIG. 4 at block 404, JSON incidents that include such WHEA events or other analytics indicating hardware failure, as detectable by a systems internal health assessor in an embodiment may comprise failed operational telemetries for a client information handling system.

At block 314, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 200 and the hardware failure prediction and avoidance system 280. For example, the data collector 261 may generate the following JSON incident based on the information gathered and stored in Table 1, above:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "fan_power_consumption" : 100W
        "Temp" : 150_F,
        "Unsuccessful_driver_install_attempts" : display_driver_14.3,
        "Unsuccessful_initialization_attempt" : gaming_app,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
```

-continued

```
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
    }
}
```

As described in greater detail in FIG. 4 at block 404, JSON incidents that include such WHEA events or other analytics indicating hardware failure, as detectable by a systems internal health assessor in an embodiment may comprise failed operational telemetries for a client information handling system.

The data classifier in an embodiment may classify objects within the gathered JSON event with preset incident types describing heat measurements, hardware component failures, or software application execution and usage for the client information handling system at the time of the event at block 316. For example, the data classifier 262 in an embodiment may edit the JSON incident created at block 302 by adding an incident classifier. More specifically, the data classifier 262 in an embodiment may analyze the JSON incident comprising failed operational telemetry generated at block 302 to identify whether any of the JSON events and values associated with preset incident classifiers appear within the JSON incident.

For example, the data classifier 262 in an embodiment may determine the JSON incident comprising failed operational telemetry described above includes the JSON event named "unsuccessful_driver_install_attempts," having a value of "display_driver_14.3," indicating a failed attempt at installing an updated display driver. In such an example embodiment, the data classifier 262 may classify the JSON incident described above as "driver_perf," indicating underperformance of a driver. As another example, the data classifier 262 in an embodiment may determine the JSON incident comprising failed operational telemetry described above includes the JSON event named "device_driver_call_failure_rate," having a value of 0.55, which may be above a preset maximum driver call failure rate of 50%, indicating a failed attempt at installing an updated display driver. In such an example embodiment, the data classifier 262 may classify the JSON incident comprising failed operational telemetry described above as "driver_perf," indicating underperformance of a driver.

In still another example, the data classifier 262 in an embodiment may determine the JSON incident comprising failed operational telemetry described above includes the JSON event named "NID_2_data_transceived," having a value of 100 GB, which may be above a preset high power transmission threshold value of 10 GB, indicating a high power gain on the WWAN interface device. In such an example embodiment, the data classifier 262 may classify the JSON incident comprising failed operational telemetry described above as "config," indicating the WWAN interface device is configured for high performance, rather than power conservation. In yet another example, the data classifier 262 in an embodiment may determine the JSON incident comprising failed operational telemetry described above includes the JSON event named "display_mode," having a value of "high definition," indicating the display is set to display video in high definition. In such an example embodiment, the data classifier 262 may classify the JSON incident comprising failed operational telemetry described above as "config," indicating the display device is configured for high performance, rather than power conservation. In still another example, the data classifier 262 in an embodiment may determine the JSON incident comprising failed operational telemetry described above includes the JSON event named "camera_detection_mode," having a value of "continuous_monitor," indicating the camera is set to continuously monitor the surrounding area of the first client information handling system 200. In such an example embodiment, the data classifier 262 may classify the JSON incident comprising failed operational telemetry described above as "config," indicating the camera is configured for high performance, rather than power conservation. As yet another example, the data classifier 262 in an embodiment may determine the JSON incident comprising failed operational telemetry described above includes the JSON event named "camera_capture_mode," having a value of "high_resolution," indicating the camera is set to capture images in at a high resolution. In such an example embodiment, the data classifier 262 may classify the JSON incident comprising failed operational telemetry described above as "config," indicating the camera is configured for high performance, rather than power conservation.

The data classifier 262 in an embodiment may apply such a classification by editing the JSON incident comprising failed operational telemetry received from the data collector 261 to generate a classified JSON incident that includes the following incident classification(s), in addition to the JSON events described above, within the JSON incident:

```
    }
      "incident_class" : Workload
      "incident_class" : Driver_perf,
      "incident_class" : Config,
    }
```

The device index mapper in an embodiment may generate a JSON incident including one or more JSON events and classified incident types at block 318. For example, the device index mapper 263 in an embodiment may associate the classified JSON incident comprising failed operational telemetry with a device ID and device model for the first client information handling system 200. Such a device ID in an embodiment may be one of several device IDs for a plurality of information handling systems (e.g., including the first and second client information handling systems 250 and 270) stored at the hardware failure prediction and avoidance system 280. The device index mapper 263 in an embodiment may then edit the classified JSON incident comprising failed operational telemetry to generate an indexed and classified JSON incident that includes this information:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
```

```
        "Device_End_of_Life" : CPU,
        "Memory_power_consumption" : 100W
        "fan_power_consumption" : 100W
        "Temp" : 150_F,
        "Unsuccessful_driver_install_attempts" : display_driver_14.3,
        "Unsuccessful_initialization_attempt" : gaming_app,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
    }
  }
  }
  "incident_class" : Workload
  "incident_class" : Driver_perf,
  "incident_class" : Config,
}
```

At block 320, a recommendation agent of the client information handling system may transmit the JSON incident generated at block 318 to a remote sustainability engine of the UEM platform in an embodiment. For example, the recommendation agent 289 of the first client information handling system 250 in an embodiment described with reference to FIG. 2 may transmit the above indexed and classified JSON incident comprising failed operational telemetry to the sustainability engine 281 operating at the hardware failure prediction and avoidance system 280. A recommendation agent 271 operating at a second client information handling system 270 may also transmit similar telemetries, indicating power usage at the second information handling system 270. As described in an embodiment with reference to FIG. 1, the UEM platform in an embodiment may operate as a cloud-based service to store data (e.g., operating environment telemetries for remote client information handling systems 100) within memory 102, static memory 103, or computer readable medium 186 received via network 170.

FIG. 4 is a flow diagram illustrating a method of predicting and avoiding future hardware failures by detecting and adjusting problematic system configurations associated with previous hardware failures according to an embodiment of the present disclosure. As described herein, the hardware failure prediction and avoidance system in embodiments of the present disclosure may perform a classification supervised learning algorithm across a pool of information, such as telemetries received, describing such software, firmware, or hardware usage and configurations, such as adjustable system configurations, across a plurality of client information handling systems that have experienced hardware failures in the past to identify combinations of usage and configurations as problematic adjustable system configurations that may be likely to produce such failures in the future. The hardware failure prediction and avoidance system in an embodiment may also routinely monitor current telemetries recording software, firmware, and hardware usage and configurations across a plurality of client information handling systems in real time to detect occurrence of the combinations of usage and configurations identified by the classification supervised learning algorithm to likely cause future failures. When such an occurrence of problematic combinations of usage and configurations, namely problematic adjustable system configurations, are detected in current telemetry, the hardware failure prediction and avoidance system may recommend adjustments to such hardware, software, or firmware usage or configuration to avoid the potential hardware failure previously caused by such a combination prior to its occurrence.

At block 402, a first JSON incident may be received at a sustainability engine from a client information handling device recommendation agent and stored in telemetry with a timestamp from the time of creation at the client information handling system in an embodiment. JSON is an example format of a markup language. Each JSON event within the JSON incident may describe a system configuration, some of which may be adjustable. For example, adjustable system configurations in an embodiment may include hardware policy settings, software and firmware update settings, usage of certain firmware or software applications or versions, or usage of background software applications. These system configurations may be adjustable by a user in response to recommendations provided by the sustainability engine to avoid potential future hardware component failures, as described in greater detail below with respect to block 416. Some JSON incidents received may indicate hardware failures, as described in greater detail below with respect to block 404. In such cases, the JSON incident identified as indicating a hardware failure may comprise a failed operational telemetry for an information handling system.

It is contemplated that any format may be used in other embodiments, including XML and YAML. For example, as described above at blocks 318 and 320 of FIG. 3, and referencing an embodiment described above with respect to FIG. 2, the recommendation agent 289 operating at a first client information handling system 250 may transmit the following indexed and classified JSON incident to the sustainability engine 281 operating at the hardware failure prediction and avoidance system 280:

```
{
  "data" :
    {
      "event_id" : 456789,
      "source_ID" : power_analytics_module,
      "timestamp_unixtime_ms" : 1544145336,
      "custom_flags" :
        {
          "CPU_workload_code_compiling_software_app" : 0.90,
          "WHEA_Error" : CPU,
          "Device_End_of_Life" : CPU,
          "Memory_power_consumption" : 100W
          "fan_power_consumption" : 100W
          "Temp" : 150_F,
          "Unsuccessful_driver_install_attempts" : display_driver_14.3,
          "Unsuccessful_initialization_attempt" : gaming_app,
          "Device_Driver_Call_Failure_Rate" : 0.55
        }
      "device_current_state :
        {
          "NID_1_type" : WLAN,
          "NID_2_type" : WWAN,
```

-continued

```
    "NID_2_data_transceived" : 100 GB,
    "NID_3_type" : BT,
    "memory_type" : 16_GB,
    "CPU_type" : X_Series,
    "GPU_type" : G_Series,
    "SSD_type" : 256_GB,
    "Display_type" : 15.6_HD_OLED,
    "Display_driver_version" : 14.2,
    "Display_mode" : high_definition,
    "Camera_type" : webcam,
    "Camera_detection_mode" : continuous_monitor,
    "Camera_capture_mode" : high_resolution,
    "OS_Version" : 10.2
    "Video_Conference_App" : Active
    "Gaming_App" : Active
    "Code_Compiling_App" : Background
    }
  }
}
```

A systems internal health assessor (SIHA) of the sustainability engine platform in an embodiment may identify the indexed and classified JSON incident, alone or as part of a sequence of JSON incidents, received at block 402 as indicating failure of a hardware component of a given hardware type, or substantial functional inefficiency of the same at block 404. For example, the SIHA 283 in an embodiment may search the indexed and classified JSON incident described above, which has been transmitted to the sustainability engine 281 and stored in telemetry 282 to identify the JSON event named "WHEA_Error," having a value CPU, indicating an error, such as a substantial inefficiency in the function at the CPU. Upon identification of such an error, alone or as part of a sequence of errors, associated with an identified hardware component, the SIHA 283 may transmit a notification to the sustainability engine 281 that the indexed and classified JSON incident (e.g., identified by event id given within the indexed and classified JSON incident), or sequence of JSON incidents indicates poor health of a hardware component. In such an embodiment, the JSON incident or sequence of JSON incidents so identified as indicating a hardware failure may comprise failed operational telemetry for an information handling system. In other embodiments, the SIHA 283 may identify JSON events named "WHEA_Error," having values identifying any of the hardware components (e.g., 220, 241, 242, 243, 244, 245a, 245b, 246, 247, 248, or 249) included within the first client information handling system 250. The SIHA 283 in such embodiments may accordingly notify the sustainability engine 281 of the indexed and classified JSON incident including such errors or sequence of errors and indicating poor health of the identified hardware component.

In another aspect, the telemetry 282 may also comprise failed operational telemetry including results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs translated into JSON incidents of hardware failures, errors, or underperformance or sequences of the same at reporting client information handling systems (e.g., 250 or 270). In such cases, those JSON incidents or sequences of JSON incidents identified as indicating a hardware failure may comprise a failed operational telemetry for an information handling system. In other embodiments, the SIHA 283 may determine that a component is failing if one or more JSON incidents for the information handling system (e.g., 250) using that hardware component (e.g., 242) include a number of errors for that component (e.g., 242) that meets or exceeds a maximum error threshold (e.g., 100, 50, 10, 5) within a preset period of time (e.g., 24 hours) and which may be alone or in combination with a sequence of errors. These are only example maximum error threshold values and preset time period values, and any values for these thresholds are contemplated herein.

As another example, the SIHA 283 may determine that a component is failing if one or more JSON incidents for the information handling system (e.g., 250) indicate a test benchmark score for that component (e.g., 242) that falls below a preset minimum benchmark threshold value (e.g., 85% of average crowd-sourced benchmark value) alone or as port of a sequence of errors or reported issues. As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. In such an embodiment, this telemetry 282 indicating test benchmark score below the average test benchmark score may comprise a failed operational telemetry for an information handling system. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a processor is failing may be 90%, for example.

At block 406, the sustainability engine may gather JSON incidents across a plurality of client information handling systems which the SIHA has identified as indicating a specific type of hardware failure through analysis of failed operational telemetry for an information handling system. As described herein, the hardware failure prediction and avoidance system in an embodiment may identify patterns or sequences of errors or underperformance in hardware failure within failed operational telemetries that may be used to avoid such failures in the future. In order to do so, the sustainability engine 281 in an embodiment may analyze power and software application analytics, and event viewer logs within such failed operational telemetries to identify one or more system configurations routinely co-occurring with, and potentially causing such failures. These power and software application analytics and event viewer logs in failed operational telemetries for client information handling systems experiencing hardware failures (e.g., as identified by the SIHA 283 at block 404) may be stored in telemetry in the form of JSON incidents received at block 402.

The $CO_2$ optimization engine in an embodiment at block 408 may perform a classification supervised learning algorithm upon the failed operational telemetries gathered at block 406 to identify a probability that an adjustable system configuration represented by a custom flag or a device current state within a JSON incident or sequence of JSON incidents comprising failed operational telemetries will co-occur in the future with the specific type of hardware failure identified by the SIHA at block 404. Classification is the process of recognizing, understanding, and grouping JSON events within JSON incidents into sub-populations. The $CO_2$ optimization engine 285 in an embodiment may train a machine-learning classifier executing a classification supervised learning algorithm based on the JSON incidents or sequence of JSON incidents comprising failed operational telemetries known to describe hardware failures in order to identify other JSON events (e.g., describing hardware, software, or firmware, usage or configurations, otherwise referred to herein as adjustable system configurations) that may routinely co-occur with JSON events identifying the known hardware failures. For example, the $CO_2$ optimization engine 285 in an embodiment may train a machine-learning classifier to determine a probability that any given JSON event within the JSON incidents or sequence of JSON incidents comprising failed operational telemetries identified by the SIHA 283 as indicating hardware failure at block 406 will co-occur in the future with the same type of hardware failure. More specifically, in an embodiment in which the SIHA 283 identified failure of a CPU at block 406, the $CO_2$ optimization engine 285 may assign a probability to each of the JSON events within the JSON incident alone or in a sequence of failed operational telemetries received at block 402 that they will co-occur in another JSON incident received in the future (e.g., from the same or another client information handling system) that also includes the CPU failure identified at block 406.

The $CO_2$ optimization engine 285 in an embodiment may perform this assignment of probabilities throughout many iterations performed across several JSON incidents identified by the SIHA 283 in failed operational telemetries as identifying a hardware failure during a training process. Many types of classification algorithms may be used in various embodiments, including logistic regression, naïve Bayes, K-nearest neighbors, decision trees, support vector machines, or gradient descent method. These classification algorithms may be trained to become classification supervised learning algorithms by adjusting probabilities assigned in each previous iteration based on the error in prediction produced in each later iteration, until the algorithm is capable of producing probabilities with an error rate below a preset error rate threshold (e.g., 1%, 2%, 5%, etc.) predicting co-occurrence of a given JSON event with a future hardware failure similar to that given in the JSON incidents alone or in a sequence in the failed operational telemetries upon which the classifier was trained. For example, such a classifier may be trained to determine a probability that a JSON event "fan_power_consumption" having a value of 100 W or a JSON event "Display_mode" having a value of high_definition may co-occur grouped in one or more future JSON incidents either alone or as a sequence of JSON incidents with a JSON event "WHEA_Error" having a value CPU.

This is only one example of a type of hardware failure for which the classification supervised learning algorithm may be trained to identify co-occurring JSON events within failed operational telemetries. In other embodiments, the JSON event within the failed operational telemetries indicating hardware failure with which the classification supervised learning algorithm correlates other JSON events describing adjustable system configurations may include WHEA failures for any known hardware component, fatal system errors, or any other type of poor hardware health indicator identified by the SIHA 283, including failure to meet benchmark testing values. Further, the JSON events for which the classification supervised learning algorithm produces probabilities of co-occurrence with indicators of such hardware failure may describe any number of adjustable system configurations in an embodiment. For example, such JSON events may indicate predicted probabilities of co-occurrence between a given hardware component failure (e.g., CPU) and adjustable system configurations such as hardware policy settings, background software application usage, execution of certain software applications or firmware, or certain versions of software applications or firmware, or update settings for software applications or firmware, as described below. In such a way, the $CO_2$ optimization engine 285 in an embodiment may predict the likelihood that a similar hardware failure identified within failed operational telemetries will occur in the future, where the same adjustable system configuration is employed.

In another aspect of an embodiment, the classification supervised learning algorithm in an embodiment may also produce probabilities that a combination of JSON events identified within failed operational telemetries may co-occur with the indicator of poor hardware health in various embodiments. For example, the $CO_2$ optimization engine 285 executing the classification supervised learning algorithm may determine there is a 72% probability that a JSON event indicating consumption of power by a fan (or other hardware component) above a preset maximum power draw threshold and a JSON event indicating execution of a specific software application (e.g., gaming application) will co-occur as a group or in a sequence in the future with a JSON event indicating hardware failure (e.g., a WHEA error identifying the CPU), as identified within failed operational telemetries. As another example, the $CO_2$ optimization engine 285 executing the classification supervised learning algorithm may determine there is a 92% probability that a JSON event indicating consumption of resources for a particular hardware component (e.g., CPU, memory, network interface device) above a preset maximum resource consumption threshold value and a JSON event indicating execution of a specific software application (e.g., gaming application) will co-occur as a group or in a sequence in the future with a JSON event indicating hardware failure (e.g., a WHEA error identifying the CPU), as identified within failed operational telemetries. In such a way, the $CO_2$ optimization engine 285 in an embodiment may predict the likelihood that a hardware failure similar to that identified within failed operational telemetries will occur in the future, where the same combination of adjustable system configurations are employed.

At block 410, the sustainability engine in an embodiment may identify an adjustable system configuration represented by a custom flag or a device current state within a JSON incident that is associated with a probability of future co-occurrence with the specific type of hardware failure identified within the failed operational telemetries that meets a preset failure probability threshold as an adjustable problematic system configuration. As described directly above, the CO2 optimization engine 285 executing a classification supervised learning algorithm in an embodiment may produce a probability that any given JSON event identifying an adjustable system configuration or combination of such JSON events will co-occur in the future with another JSON event indicating hardware failure, as identified within failed operational telemetries. The CO2 optimization engine 285 in an embodiment may transmit to the sustainability engine an identification of certain JSON events associated with probabilities for co-occurrence with a future hardware failure that meet a failure probability threshold value. For example, the CO2 optimization engine 285 may transmit to the sustainability engine an identification of a JSON event or a combination of JSON events associated with a probability for co-occurrence with a future hardware failure (e.g., as determined above with respect to block 406) that meets or exceeds a preset failure probability threshold value (e.g., 90%, 95%, 98%, 99%). These are only a few examples of such a preset failure probability threshold value. Other embodiments contemplate usage of a preset failure probability threshold value that may be correlated to a frequency with which users accept recommendations for adjustments to the adjustable system configurations to avoid future hardware failure, similar to that identified within failed operational telemetries, as described in greater detail with respect to block 416 below, for example. Any JSON event identified in such a way by the CO2 optimization engine 285 in an embodiment may be labeled as a problematic adjustable system configuration.

The sustainability engine in an embodiment at block 412 may receive a current indexed and classified JSON incident from a client information handling system. As described herein, the hardware failure prediction and avoidance system in an embodiment may routinely monitor current telemetries recording software, firmware, and hardware usage and configurations across a plurality of client information handling systems in real time to detect occurrence of problematic combinations of usage and configurations identified by the classification supervised learning algorithm to likely cause future failures. For example, the sustainability engine in an embodiment may receive the following JSON incident from the second client information handling system 270:

```
{
  "data" :
  {
    "client_device_ID" : 456789,
    "client_device_model" : Laptop_5400,
    "event_id" : 567890,
    "source_ID" : power_analytics_module,
    "timestamp_unixtime_ms" : 1545256447,
    "location" : Dallas_Texas,
    "custom_flags" :
    {
      "CPU_workload_code_compiling_software_app" : 0.90,
      "Device_End_of_Life" : CPU,
      "Memory_power_consumption" : 100W
      "fan_power_consumption" : 100W
      "Temp" : 150_F,
      "Unsuccessful_driver_install_attempts" : display_driver_14.3,
```

-continued

```
      "Unsuccessful_initialization_attempt" : gaming_app,
      "Device_Driver_Call_Failure_Rate" : 0.55
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 32_GB,
      "CPU_type" : Y_Series,
      "GPU_type" : GX_Series,
      "SSD_type" : 256_GB,
      "Display_type" : 15.6_HD_LCD,
      "Display_driver_version" : 14.2,
      "Display_mode" : high_definition,
      "Camera_type" : webcam,
      "Camera_detection_mode" : continuous_monitor,
      "Camera_capture_mode" : high_resolution,
      "OS_Version" : 10.2
      "Gaming_App" : Active
      "Code_Compiling_App" : Background
    }
  }
}
  "incident_class" : Workload
  "incident_class" : Driver_perf,
  "incident_class" : Config,
}
```

At block 414, the sustainability engine may determine whether the current indexed and classified JSON incident received at block 412 contains an adjustable problematic system configuration. As described herein, when an occurrence of one or more problematic adjustable system configurations (e.g., combinations of usage and configurations) are detected in current telemetry, the hardware failure prediction and avoidance system may recommend adjustments to such adjustable system configurations (e.g., hardware, software, or firmware usage or configuration) to avoid the potential hardware failure previously caused by such a combination, prior to its occurrence. Various hardware policy settings in an embodiment may be determined to be an adjustable problematic system configuration in an embodiment, due to high demands on various hardware components. For example, hardware configurations currently in place at the device of interest may be optimized for performance, rather than power consumption. These hardware policy settings may be identified with reference to the JSON incidents received at block 412, shown directly above, and stored in telemetry. For example, the hardware failure prediction and avoidance system 280 may identify the JSON event named "incident_class," having a value "config," indicating one or more hardware components may be configured for high performance rather than for low power consumption. Upon identification of the JSON incident classification under the configuration classifier, the hardware failure prediction and avoidance system 280 in such an embodiment may further search the JSON incident to identify which hardware components are currently configured for high performance. For example, the hardware failure prediction and avoidance system 280 in an embodiment may identify the JSON event named "NID_2_data_transceived," having a value of 100 GB, which may be above a preset high power transmission threshold value of 10 GB, to identify the WWAN interface device (e.g., 220) as currently configured for high performance (high data transmission), rather than low power consumption.

As another example, the hardware failure prediction and avoidance system 280 in an embodiment may identify the JSON event named "display_mode," having a value of "high_definition," to identify the display device 245 as currently configured for high performance (high definition display), rather than low power consumption. As still another example, the hardware failure prediction and avoidance system 280 in an embodiment may identify the JSON event named "camera_detection_mode," having a value of "continuous_monitor," or the JSON event named "camera_capture_mode," having a value of "high_resolution," to identify the camera 248 as currently configured for high performance (continuous monitoring and high resolution image capture), rather than low power consumption. In another example, the hardware failure prediction and avoidance system 280 may determine that the GPS unit 249 is currently set to continuous location determination, or determination of location at a relatively high frequency (e.g., once per minute). In yet another example, the hardware failure prediction and avoidance system 280 may identify one or more software or firmware applications consuming a large proportion of resources for one or more hardware components. More specifically, the hardware failure prediction and avoidance system 280 may identify one or more software or firmware applications consuming a percentage of processor resources above a preset maximum processor resource threshold value (e.g., 85%), or consuming a percentage of memory resource above a preset maximum memory resource threshold value (e.g., 85%). In another aspect of an embodiment, the hardware failure prediction and avoidance system 280 may identify that a combination of software or firmware applications are consuming a percentage of processor resources above a preset maximum processor resource threshold value (e.g., 85%), or consuming a percentage of memory resource above a preset maximum memory resource threshold value (e.g., 85%). These are only examples of possible preset maximum hardware component resource threshold values and other embodiments contemplate other values (e.g., 90%, 95%), and contemplate the memory resource threshold value and processor resource threshold value having different values.

Execution of background software applications in an embodiment may also be determined to be an adjustable problematic system configuration in an embodiment. These background software application executions may be identified with reference to the JSON incident received at block 412, and stored in telemetry. For example, the hardware failure prediction and avoidance system 280 may determine that background applications are consuming hardware component resources above a maximum background usage value.

Methods for software and firmware updates in an embodiment may also be determined to be an adjustable problematic system configuration in an embodiment. These methods for software and firmware updates may be identified with reference to the JSON incident received at block 412, and stored in telemetry. For example, the hardware failure prediction and avoidance system may determine, with reference to stored telemetry 282 software frequency, failures, or efficiency of updates and initializations of firmware or software. The sustainability engine 281 may search the JSON incident received at block 412, and stored in telemetry to identify indications within the indexed and classified JSON incident of inefficient or unnecessary firmware or software updates or initializations and poor driver or software applications performance. For example, the sustainability engine 281 may search the JSON incident received at block 412, and stored in telemetry to identify the JSON event named "incident_class," having a value "driver_perf," indicating poor driver performance, and identify the JSON event named "unsuccessful_driver_install_attempts," having a value of "display_driver_14.3," or the JSON event named "device_driver_call_failure_rate," having a value of 0.55, which may be above a preset maximum driver call failure rate of 50%. Either of these JSON events so identified by the sustainability engine 281 in an embodiment may indicate that the display device driver is the underperforming driver that caused the JSON incident to be classified under the driver performance classification. As another example, the sustainability engine 281 in an embodiment may search the indexed and classified JSON incidents received at block 412 to identify the JSON event named "unsuccessful_initialization_attempt" having a value of "gaming application." Detection of multiple JSON events with these same values within a single JSON incident or a sequence of JSON incidents in some embodiments, may indicate repeated failed initializations for a specific software application (e.g., gaming application) in an embodiment.

Execution of specific software applications or specific versions of software applications or firmware drivers in an embodiment may also be determined to be an adjustable problematic system configuration in an embodiment. These specific software application executions or executions of specific versions of software applications or firmware drivers may be identified with reference to the JSON incident received at block 412, and stored in telemetry. For example, the hardware failure prediction and avoidance system 280 may reference the indexed and classified JSON incident above to identify the JSON event "display_driver_14.3," indicating current use of the display driver version 14.3 at the device of interest. In another example embodiment, the hardware failure prediction and avoidance system 280 may reference the indexed and classified JSON incident above to identify the JSON event "gaming_app," having a value of active, indicating current execution of the gaming software application.

Consumption of power for a specific hardware component in an embodiment may also be determined to be an adjustable problematic system configuration in an embodiment. These high power consumption levels may be identified with reference to the JSON incident or sequence received at block 412, and stored in telemetry. For example, the hardware failure prediction and avoidance system 280 may reference the indexed and classified JSON incident above to identify the JSON event "fan_power_consumption" having a value of 100 W, indicating current 100 W power consumption by the fan, which may exceed a preset fan power draw threshold value. In other embodiments, the JSON incident may include other JSON events identifying power consumption by other hardware components exceeding a preset power draw threshold value. This is only one example of a preset power draw threshold value. Other embodiments contemplate other values, and different hardware components may be associated with different power draw threshold values.

If an adjustable problematic system configuration is not found in current telemetry, the telemetry may provide no indication of potential future hardware failure, and the method for predicting and avoiding future hardware failures may then end. If an adjustable problematic system configuration is found in current telemetry, this may indicate that a hardware error may be likely to occur, and the method may proceed to block 416 for recommendations to adjust the problematic system configuration in order to avoid such a hardware error occurring.

The sustainability engine in an embodiment may transmit a recommendation to the first client information handling system in an embodiment to change the adjustable problematic system configuration at block 416. For example, in an embodiment in which the sustainability engine 281 identified a hardware policy setting as a problematic adjustable system configuration, the hardware failure prediction and avoidance system may recommend adjustment to the hardware policy settings at the second client information handling system 270 to avoid potential future failure of one or more hardware components. More specifically, the hardware failure prediction and avoidance system 280 in an embodiment may transmit a recommendation to the recommendation agent 289, for display to the user via a graphical user interface (GUI) 290 that the user decrease power supplied to the network interface device, or shift transmission of data from one network interface device to another, lower power network interface device. In an embodiment in which the hardware failure prediction and avoidance system 280 determines the WWAN interface device or WLAN interface device (e.g., 220) is currently configured for high performance (high data transmission), rather than low power consumption, the hardware failure prediction and avoidance system 280 may, for example, recommend to the user, via the GUI 290, that the user decrease power made available to the WWAN or WLAN interface device 220.

The hardware failure prediction and avoidance system in another embodiment may transmit a recommendation to the recommendation agent 289, for display to the user, via a GUI 290, placing the display into a power savings or standard definition mode. For example, in an embodiment in which the hardware failure prediction and avoidance system 280 determines the display device 245a is currently configured for high performance (high definition display), rather than low power consumption, the hardware failure prediction and avoidance system 280 may recommend, via GUI 290, that the user adjust the policies for the display 245a to place the display in a standard definition mode or a low power mode. In another example embodiment, the hardware failure prediction and avoidance system 280 may recommend to the user, via GUI 290, that the user adjust the policies for the camera 248 to turn off continuous monitoring or decrease image capture resolution.

As another example, in an embodiment in which the sustainability engine 281 identified a background application usage as a problematic adjustable system configuration, the hardware failure prediction and avoidance system may recommend adjustment to the background application usage at the second client information handling system 270 to avoid potential future failure of one or more hardware components. More specifically, in an embodiment in which one or more background software applications are using hardware resources at a maximum background usage value (e.g., 85%), the sustainability engine 291 may transmit a recommendation to the recommendation agent 289 for display to the user via GUI 290 to decrease the usage of those hardware component resources for those background applications by ten percent. In some cases, such a recommendation may be triggered by a single background software application using hardware component resources above the maximum background usage value. In other cases, such a recommendation may be triggered by a plurality of background software applications which are, in combination, consuming hardware component resources meeting or exceeding the maximum background usage value. In an embodiment, the background software application(s) may be consuming resources of a single hardware component meeting the maximum background usage value. In such an embodiment, the recommendation may be to decrease usage by the background software application(s) of only resources at that hardware component (e.g., CPU). In other embodiments, the background software application(s) may be consuming resources of a plurality of hardware components meeting the maximum background usage value. In such an embodiment, the recommendation may be to decrease usage by the background software application(s) of resources at each of those hardware components (e.g., CPU, memory). Also, the recommended percentage of decrease may vary. For example, the recommendation may be to decrease usage (e.g., by restricting resources of the given hardware component made available to the specific software application) by less than ten percent or to terminate usage of certain applications (e.g., background applications) entirely and from the client information handling system for other tasks in the enterprise to extend lifetime of parts.

In yet another example, in an embodiment in which the sustainability engine 281 identified a software or firmware update method as a problematic adjustable system configuration, the hardware failure prediction and avoidance system may recommend adjustment to the software or firmware update methods at the second client information handling system 270 to avoid potential future failure of one or more hardware components. More specifically, the hardware failure prediction and avoidance system 280 in an embodiment may transmit a recommendation to the recommendation agent 289 for display to the user via GUI 290 to pause repeated attempts at unsuccessful installations of drivers. For example, the hardware failure prediction and avoidance system 280 may reference the indexed and classified JSON incident above to identify the JSON event named "unsuccessful_driver_install_attempts," having a value of "display_driver_14.3," indicating a failed attempt at installing the display driver version 14.3. In such a scenario, the hardware failure prediction and avoidance system 280 may recommend that the user pause or terminate future attempts at installing the display driver version 14.3. In another example, the hardware failure prediction and avoidance system 280 may reference the indexed and classified JSON incident above to identify the JSON event named "unsuccessful_initialization_attempt," having a value of "gaming_app," indicating a failed attempt at initializing a gaming application. In such a scenario, the hardware failure prediction and avoidance system 280 may recommend that the user pause or terminate future attempts at initializing the gaming application in order to avoid potential future hardware failures that may be caused by such repeated initialization attempts.

In still another example, in an embodiment in which the sustainability engine 281 identified execution of a software application or execution of a specific version of software or firmware as a problematic adjustable system configuration, the hardware failure prediction and avoidance system may recommend installation of updated drivers or software applications, or termination of certain software applications at the second client information handling system 270 to avoid potential future failure of one or more hardware components. More specifically, the hardware failure prediction and avoidance system 280 may transmit a recommendation to the recommendation agent 289 to display to the user via GUI 290 a recommendation that the user download the most recent version of the driver for the display device. The hardware failure prediction and avoidance system 280 in such an embodiment may further recommend deletion of previous versions of the driver that may interfere with proper execution of the most recent version of the driver, in some embodiments.

In an embodiment in which one or more software applications are using hardware resources at a maximum usage value (e.g., 85%), the sustainability engine 291 may transmit a recommendation to the recommendation agent 289 for display to the user via GUI 290 to decrease the usage of those hardware component resources for those specific software applications by ten percent. In some cases, such a recommendation may be triggered by a single software application using hardware component resources above the maximum usage value. In other cases, such a recommendation may be triggered by a plurality of software applications which are, in combination, consuming hardware component resources meeting or exceeding the maximum software application usage value. In an embodiment, the software application(s) may be consuming resources of a single hardware component meeting the maximum software application usage value. In such an embodiment, the recommendation may be to decrease usage by the software application(s) of only resources at that hardware component (e.g., CPU). In other embodiments, the software application(s) may be consuming resources of a plurality of hardware components meeting the maximum software application usage value. In such an embodiment, the recommendation may be to decrease usage by the software application(s) of resources at each of those hardware components (e.g., CPU, memory). Also, the recommended percentage of decrease may vary. For example, the recommendation may be to decrease usage (e.g., by restricting resources of the given hardware component made available to the specific software application) by less than ten percent or to terminate usage of certain applications entirely. The method for predicting and avoiding future hardware failures similar to those identified within failed operational telemetries may then end The blocks of the flow diagrams of FIGS. 3, and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A hardware failure prediction and avoidance system executing on a unified endpoint management (UEM) platform information handling system comprising:
    a network interface device to receive failed operational telemetries for a plurality of client information handling systems including power analytics, software application analytics, and event viewer error logs, wherein each failed operational telemetry includes an error associated with a labeled hardware type;
    a processor executing code instructions of the hardware failure prediction and avoidance system to:
        execute a classification supervised learning algorithm on the failed operational telemetries to determine a failure probability, meeting a preset failure probability threshold value, that an adjustable hardware or software configuration described by future operational telemetries will co-occur with the error of the labeled hardware type;
        identify the adjustable hardware or software configuration as a problematic system configuration;
    the network interface device to receive a current operational telemetry for a first client information handling system including current power analytics, current software application analytics, and current event viewer error logs;
    the processor to identify the problematic system configuration by correlating the current operational telemetry with a portion of the failed operational telemetries such that the failure probability meets the preset failure probability threshold value; and
    the network interface device to transmit a recommendation to the first client information handling system to adjust or terminate the problematic system configuration in order to avoid occurrence of the error identified in the failed operational telemetries at the first client information handling system.

2. The information handling system of claim 1, wherein the adjustable hardware or software configuration includes hardware policy settings.

3. The information handling system of claim 1, wherein the adjustable hardware or software configuration includes a performance mode for a hardware component.

4. The information handling system of claim 1, wherein the adjustable hardware or software configuration includes a power conservation setting for a hardware component.

5. The information handling system of claim 1, wherein the adjustable hardware or software configuration includes a limitation of hardware component resources consumed during execution of background software applications.

6. The information handling system of claim 1, wherein the labeled hardware type is a type of processing unit.

7. The information handling system of claim 1, wherein the hardware type is a type of network interface device.

8. A method of hardware failure prediction and avoidance comprising:
    receiving, via a network interface device, failed operational telemetries for a plurality of client information handling systems including power analytics, software application analytics, and event viewer error logs, wherein each failed operational telemetry includes an error associated with a labeled hardware type;

applying a classification supervised learning algorithm to the failed operational telemetries, via a processor, to determine a failure probability, meeting a preset failure probability threshold value, that an adjustable hardware or software configuration described by future operational telemetries will co-occur with the error of the labeled hardware type;

identifying the adjustable hardware or software configuration as a problematic system configuration;

receiving a current operational telemetry for a first client information handling system including current power analytics, current software application analytics, and current event viewer error logs;

identifying the problematic system configuration within the current operational telemetry as correlated with at least a portion of the failed operational telemetry such that the failure probability of the adjustable hardware or software configuration that is identified as the problematic system configuration meets the preset failure probability threshold value; and transmitting a recommendation to the first client information handling system to adjust or terminate the problematic system configuration in order to avoid occurrence of the error identified in the failed operational telemetries at the first client information handling system.

9. The method of claim 8, wherein the hardware type is a type of memory device.

10. The method of claim 8, wherein the hardware type is a type of cooling unit.

11. The method of claim 8, wherein the adjustable hardware or software configuration includes background software application usage.

12. The method of claim 8, wherein the adjustable hardware or software configuration includes software or firmware update settings.

13. The method of claim 8, wherein the adjustable hardware or software configuration includes a version of software or firmware installed.

14. The method of claim 8, wherein the adjustable hardware or software configuration includes repeated initialization of a process.

15. A hardware failure prediction and avoidance system executing on a unified endpoint management (UEM) platform information handling system comprising:

a network interface device to receive failed operational telemetries for a plurality of client information handling systems including power analytics, software application analytics, and event viewer error logs, wherein each failed operational telemetry includes an error associated with a labeled hardware type;

a processor executing code instructions of the hardware failure prediction and avoidance system to:

execute a classification supervised learning algorithm on the failed operational telemetries to determine a failure probability, meeting a preset failure probability threshold value, that a plurality of adjustable hardware or software configurations described by future operational telemetries will co-occur with the error of the labeled hardware type;

identify the plurality of adjustable hardware or software configurations as a problematic system configuration combination;

the network interface device to receive a current operational telemetry for a first client information handling system including current power analytics, current software application analytics, and current event viewer error logs;

the processor to identify the problematic system configuration combination corresponding to at least a portion of the failed operational telemetries within the current operational telemetry such that the failure probability of the identified problematic system configuration combination meets the preset failure probability threshold value; and the network interface device to transmit a recommendation to the first client information handling system to adjust or terminate one or more of the plurality of adjustable hardware or software configurations within the problematic system configuration combination in order to avoid occurrence of the error identified in the failed operational telemetries at the first client information handling system.

16. The information handling system of claim 15, wherein the plurality of adjustable hardware or software configurations within the problematic system configuration includes consumption of power by a fan above a preset maximum fan power draw threshold value, and usage of a specific software application.

17. The information handling system of claim 15, wherein the plurality of adjustable hardware or software configurations within the problematic system configuration includes consumption of memory resources above a preset maximum memory resource threshold value, and usage of a specific software application.

18. The information handling system of claim 15, wherein the plurality of adjustable hardware or software configurations within the problematic system configuration includes consumption of processor resources above a preset maximum processor resource threshold value, and usage of a specific software application.

19. The information handling system of claim 15, wherein the plurality of adjustable hardware or software configurations within the problematic system configuration includes consumption of memory resources above a preset maximum memory resource threshold value, and repeated initialization of a specific software application.

20. The information handling system of claim 15, wherein the plurality of adjustable hardware or software configurations within the problematic system configuration includes consumption of processor resources above a preset maximum processor resource threshold value, and execution of a background software application.

* * * * *